US011586375B1

(12) United States Patent
Nagapudi et al.

(10) Patent No.: US 11,586,375 B1
(45) Date of Patent: *Feb. 21, 2023

(54) INCREMENTAL RESTORE FOR VOLUMES USING OBJECT-BASED SNAPSHOTS

(71) Applicant: Amazon Technologies, Inc., Seattle, WA (US)

(72) Inventors: Venkatesh Nagapudi, San Jose, CA (US); Sandeep Kumar, Sammamish, WA (US); Archana Padmasenan, Sammamish, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/304,931

(22) Filed: Jun. 28, 2021

(51) Int. Cl.
*G06F 3/06* (2006.01)
*G06F 16/11* (2019.01)
*G06F 9/455* (2018.01)

(52) U.S. Cl.
CPC ............ *G06F 3/065* (2013.01); *G06F 3/0604* (2013.01); *G06F 3/067* (2013.01); *G06F 3/0664* (2013.01); *G06F 9/45558* (2013.01); *G06F 16/128* (2019.01); *G06F 2009/45579* (2013.01); *G06F 2009/45595* (2013.01)

(58) Field of Classification Search
None
See application file for complete search history.

(56) References Cited

U.S. PATENT DOCUMENTS

| 2019/0022771 | A1 | 7/2019 | Li |
| 2020/0167238 | A1* | 5/2020 | Killamsetti ......... G06F 11/1461 |
| 2020/0409803 | A1 | 12/2020 | Naidu et al. |

* cited by examiner

*Primary Examiner* — Brian R Peugh
(74) *Attorney, Agent, or Firm* — Knobbe, Martens, Olson & Bear, LLP

(57) ABSTRACT

Systems and methods are provided for conducting incremental restore operations on block storage volumes using an object-based snapshot. A full restore from an object-based snapshot can include copying all blocks of a data set from the object-based snapshot to a destination volume. For high capacity volumes, full restores may take large amounts of time. Moreover, full restores may be inefficient where a destination volume already contains some data of the snapshot. Embodiments of the present disclosure provide for incremental restore operations, where a delta data set is transferred from the snapshot to the destination volume, representing data in the snapshot is not known to already exist on the volume or another available volume.

22 Claims, 9 Drawing Sheets

INCREMENTAL RESTORE FOR VOLUMES USING OBJECT-BASED SNAPSHOTS

BACKGROUND

Cloud computing, in general, is an approach to providing access to information technology resources through services, such as Web services, where the hardware and/or software used to support those services is dynamically scalable to meet the needs of the services at any given time. In cloud computing, elasticity refers to network-delivered computing resources that can be scaled up and down by the cloud service provider to adapt to changing requirements of users. The elasticity of these resources can be in terms of processing power, storage, bandwidth, etc. Elastic computing resources may be delivered automatically and on-demand, dynamically adapting to the changes in resource requirement on or within a given user's system. For example, a user can use a cloud service to host a large online streaming service, set up with elastic resources so that the number of webservers streaming content to users scale up to meet bandwidth requirements during peak viewing hours, and then scale back down when system usage is lighter.

A user typically will rent, lease, or otherwise pay for access to resources through the cloud, and thus does not have to purchase and maintain the hardware and/or software to provide access to these resources. This provides a number of benefits, including allowing users to quickly reconfigure their available computing resources in response to the changing demands of their enterprise, and enabling the cloud service provider to automatically scale provided computing service resources based on usage, traffic, or other operational needs. This dynamic nature of network-based computing services, in contrast to a relatively static infrastructure of on-premises computing environments, requires a system architecture that can reliably re-allocate its hardware according to the changing needs of its user base.

Cloud service providers can provide computing resources in a variety of forms, which may be combined by users to provide desired functions or services. For example, a cloud provider can provide compute resources, like virtual machines, that conduct computation, block storage resources that act as virtual hard drives for compute resources, object storage services that act as network-accessible data stores, and the like. As the number of users of cloud services grows, the amount of data held and maintained by the cloud services can become very large. To ensure correct operation of cloud services, a provider can undertake a variety of processing tasks with respect to that data. For example, a provider may replicate data to ensure resiliency, or may re-distribute data or processing on a cloud service to better balance load of devices. As the volume of data and processing handled by a cloud service grows, these tasks can themselves utilize significant computing resources.

DETAILED DESCRIPTION

Figure 1:
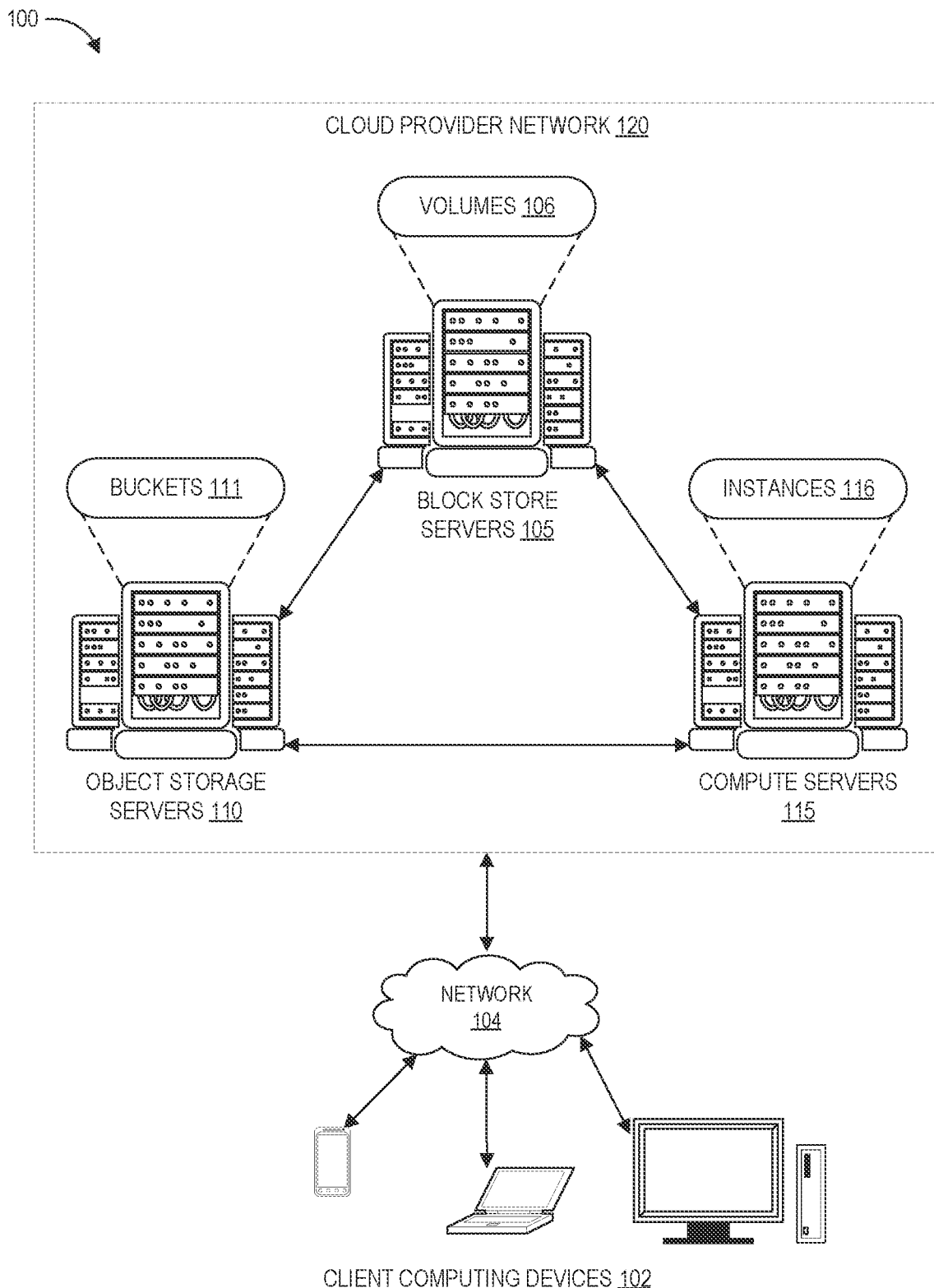
FIG. 1 depicts a schematic diagram of a cloud provider network in which various embodiments according to the present disclosure can be implemented.

Generally described, aspects of the present disclosure relate to efficiently creating cloud-based storage volumes from object-based snapshots of data on such volumes. More specifically, embodiments of the present disclosure relate to incrementally restoring a volume from a snapshot, reducing data transfer required for the restore by detecting and moving a minimum amount of data needed to restore the volume. As described herein, a block storage volume can represent a virtualized storage drive (e.g., a virtual "hard drive"), and an object-based snapshot can reflect a point-in-time representation of that block storage volume, with the snapshot being stored as separately from the block storage volume as a set of objects on an object storage service. An object-based snapshot can therefore be viewed conceptually as a "copy" of the volume (as it existed at a given point in time), which may for example be stored as a set of files on a network-accessible storage service. Object-based snapshots are distinct from pointer-based snapshots, a different type of snapshot that utilizes on-disk pointers to prevent overwriting of current data of a volume. While pointer-based snapshots can often be rapidly created, they do not typically provide resiliency, as they do not create a distinct copy of data and thus, for example, are susceptible to physical disk failures. Object-based snapshots address this problem, but typically require high amounts of data transfer, as each block of data must be duplicated when creating or restoring the object-based snapshot. As a result, creation and restore operations on a snapshot can take significant time. One approach to solving this issue is to provide incremental operations. For example, when creating an object-based snapshot, a snapshot service may duplicate to a new snapshot only blocks altered since a prior snapshot. As a result, fewer blocks may be duplicated, reducing creation time. This approach relies in part on knowledge of that a prior snapshot exists in a known state, enabling a difference to be determined between a current state of the volume and the prior snapshot. For example, a snapshot service may store metadata for a volume indicating when a prior snapshot was created, and what data has been modified subsequent to that point in time. In contrast, object-based snapshot services typically do not provide incremental restore capabilities, in part because it is difficult to determine a difference between a current state of a volume and the data stored within any given object-based snapshot.

Embodiments of the present disclosure address the above-noted problems by enabling for incremental restore of an object-based snapshot, restoring from the snapshot only those blocks modified relative to blocks currently stored on a block storage volume. More specifically, embodiments of the present disclosure provide for block storage volumes with known state, corresponding to an object-based snapshot stored on an object storage service. This snapshot can be referred to as the "source" snapshot for the volume. When a request to restore a target object-based snapshot is received, the system can identify an existing block storage volume and the source snapshot for that volume. The system can further determine a difference (or "delta") between the source snapshot and the target snapshot, reflecting a set of blocks stored in the target snapshot but not stored in the source snapshot. The system can then retrieve the changed blocks from the target snapshot, and combine these changed blocks with the data from the existing volume (e.g., matching the source snapshot). As a result, a full set of data matching the target snapshot is created, without requiring retrieval of that full set of data from the target snapshot. In many cases, the delta between a source and target snapshot can be expected to be small relative to all data in the snapshot—often on the order of single digit percentages. Thus, the amount of data retrieved from the target snapshot during a restore operation can be substantially reduced.

In one embodiment, the changed blocks from the target snapshot are applied directly to the existing volume. As a result, data transfer is limited to the changed blocks, substantially reducing the data transfer required in order to conduct a "full" restore operation on a target snapshot.

In another embodiment, the changed blocks from the target snapshot are applied to a new volume, which is also populated with data from the existing volume. In such an embodiment, data transfer may be similar or the same as the data transfer that would otherwise be required to conduct a full restore operation on the target snapshot. Nevertheless, this approach may be preferable for a number of reasons. For example, the existing volume may support a higher read speed than the object storage service. Illustratively, the existing volume may be a high parallelism volume, such as those disclosed in U.S. Pat. No. 10,983,719, issued Apr. 20, 2021, the entirety of which is incorporated by reference herein. As another example, the existing volume and the newly created volume may be connected via a network connection that is faster than a connection between the newly created volume and the object storage service storing the target snapshot, in terms such as latency, bandwidth, or both. This faster connection can result in faster "hydration" of the newly created volume; that is, a faster time for the newly created volume to be in a state matching that of the target snapshot. This faster connection can further enable enhanced performance of the volume prior to hydration being complete, relative to a volume created exclusively by data transfer from a target snapshot. For example, a new volume may handle requests to read data not yet populated on the volume (e.g., read "misses") by retrieving the data from a data source. Where a target snapshot is the sole data source, handling such misses may take large amounts of time, in some cases so much time that this handling is disabled entirely (e.g., such that unpopulated data simply cannot be read from a volume being hydrated). However, when using an existing volume as a data source, it may be relatively fast to handle misses by reading the requested data from the existing volume, given a sufficiently fast (e.g., low latency) network connection between the new volume and the existing volume. Thus, characteristics of an existing volume, or a network connection between that volume and a new volume, may mean that population of a new volume from a combination of an existing volume and a target snapshot is preferable to population solely from a target snapshot.

As noted above, incremental restore—that is, restoring a snapshot by reading only a portion of the data of that snapshot—can be based at least partly on knowledge that an existing volume stores data corresponding to another snapshot. For example, if a volume is initially created from a snapshot, a storage service may store metadata for the volume indicating that it contains data of that source snapshot. Each time a new snapshot is incrementally restored to the volume, the storage service may update that metadata, reflecting that the volume now stores data matching that of the new snapshot (which now becomes the source snapshot for the volume). In some embodiments, the volume may be maintained in a read only state, such that no writes are possible to the volume, thus ensuring that the volume's data continues to match data stored in the source snapshot. In other embodiments, the storage service may maintain a write log for the volume, reflecting changes to the volume relative to the source snapshot. When determining differences between a target snapshot and a source snapshot, the block locations for written-to blocks of the volume may be added to the listing of changed blocks, such data for blocks in the written-to blocks of the volume are retrieved from the target snapshot. For example, if a client writes to block 1 of a volume created from a source snapshot, and then requests to restore a target snapshot to the volume, the system may mark block 1 as part of the "delta" in data to be retrieved from the target snapshot, regardless of whether block 1 actually differs between the source and target snapshot. This ensures that block 1 of the volume is altered to match data stored in the target snapshot, effectively overwriting whatever data was written to that block previously. In this way, volumes used to support incremental snapshot restore are not required to be kept in a read-only state.

In addition to knowledge that an existing volume stores data corresponding to another snapshot, incremental restore can be based at least partly on knowledge of a delta between two snapshots. For example, a snapshot service can maintain snapshots within a hierarchical structure, with a root snapshot indicating a first known set of block values, and each "child" snapshot representing a difference in block values relative to a parent snapshot. In one embodiment, creation of a child snapshot may be incremental, such that only blocks of a volume that have changed since the prior "parent" snapshot are written to the service. These changed blocks then reflect the delta between the two snapshots. This process can be repeated to identify the delta (e.g., those blocks with different data) for any two snapshots within the hierarchy. For example, the difference between a child and a more distance direct predecessor snapshot (e.g., a "grandparent" or "great grandparent") can be represented as the sum of deltas between each generation. The difference between a snapshot and a "sibling" (e.g., two distinct snapshots each created from a common parent) can be represented as the sum of deltas between the parent and each child. For example, if child one modified block 1 of the parent, and child two modified block 2 of the parent, then in order to modify child two to match the data of child one, one need only read blocks 1 and 2 of the child one snapshot and write them to child two. Accordingly, deltas between any two related snapshots can be quickly identified within a snapshot hierarchy. Notably, these techniques do not require direct comparison of data within two snapshots, as the delta from a prior snapshot can be record when creating that snapshot. Further description of example techniques for identifying block differences between snapshots are provided in U.S. Pat. No. 11,016,671, issued May 25, 2021, and U.S. patent application Ser. No. 17/027,374, entitled "Efficient Identification of Snapshot Objects using Full and Differential Snapshot Manifests" and filed Sep. 21, 2020, the entireties of which are incorporated by reference herein.

In some embodiments, a snapshot service may further identify differences between unrelated snapshots. For example, the service may enable a block-by-block comparison of the two snapshots, to identify such differences. In some cases, block-by-block comparisons can be made more efficient based on storage of blocks. For example, a snapshot service may store blocks in objects (e.g., files). In some instances, each object may reflect a single block of a volume. In other instances, each object may reflect multiple blocks. The service may further use an identifier that reflects the blocks contained within the object, such as a hash value of the data in the object. The service may then identify identical object when their object identifiers match, and identify non-identical object when such identifiers do not match. By comparing the identifiers of all object within two snapshots, differences between the snapshots can be quickly identified. For example, a snapshot service may store for each snapshot a "manifest" that lists all objects making up the snapshot. The differences between two snapshots may then be determined by identifying all objects listed in the manifest for one snapshot but not in the manifest for the other.

As used herein, the term "volume" refers to a block storage volume: a logical collection of data that organizes fixed-size portions of data into logical units called blocks, and enables reading and writing to the collection on the basis of reading or writing blocks according to an identifier of the block. Examples of protocols that provide for accessing and manipulating block storage are mass storage protocols such as Serial AT Attachment (SATA) and Small Computer System Interface (SCSI)—protocols also associated with physical mass storage devices, like disk drives or solid state drives. For this reason, block storage volumes may often be used as virtualized mass storage devices (e.g., virtual "hard drives").

As noted above, the term "snapshot" may refer to different technologies in different contexts, including object-based snapshots (e.g., a distinct record of all data in a volume, stored as a set of objects on an object storage service) or pointer-based snapshots (e.g., a pointer in a volume that refers to data unchanged since a specific point in time). Unless otherwise specified, the term "snapshot," if used herein and not qualified as object- or pointer-based, should be understood to refer to an object-based snapshot, and not to a pointer-based snapshot.

Various examples may be provided herein related to "restoring" a snapshot. This operation should be understood to refer to creating or modifying a block storage volume such that the data of the volume matches the data as contained within the snapshot. Restoring a snapshot may also be referred to as restoring a volume from a snapshot. A "full" restore of a snapshot generally refers to a restore in which all data of the snapshot is transferred from the snapshot to a target volume. An "incremental" restore of a snapshot generally refers to a restore in which only some data is transferred from the snapshot to a target volume, with the remaining data being either retrieved from another source (e.g., an existing volume) or already existing on the target volume (e.g., where the target volume was created from another snapshot with a known relation to the snapshot being restored).

One skilled in the art will recognize the many applications of incremental snapshot restores. For example, one benefit of object-based snapshots is resiliency, desired for example in disaster recovery scenarios. In such a scenario, a user may restore their volume data from a snapshot in order to restore operation of a computing device reliant on that volume data. However, where only full snapshot restores are supported, the time needed to restore a volume may be high. For example, even when a network provides high throughput (e.g., on the order of a terabyte per hour), large data volumes (e.g., multiple terabytes) may take hours or days to restore. This may be an undesirable or unacceptable delay for product systems. Because utilizing incremental snapshot restores can significantly reduce data transfer, or enable a volume to be used before data transfer completes, the embodiments described herein can significantly reduce or eliminate this delay.

In some embodiments, a cloud computing provider can provide additional functionality that facilitates various client use cases. For example, where a client wishes to use incremental snapshot restores to provide disaster recovery, a provider may automate creation of source volumes that facilitate later incremental restores. For example a snapshot system may, on detecting creation of a new snapshot for a production volume, automatically create or modify another disaster recovery volume to match the new snapshot (e.g., using an incremental restore relative to a past state of the disaster recovery volume). In this way, a second volume may be kept "up to date" with a latest snapshot of a production volume. Notably, use of snapshot restoration can be beneficial relative to simply creating a duplicate of the production volume, as the incremental nature of snapshots can enable the disaster recovery volume to be rolled back (or forward) within a snapshot lineage, and to be updated to a new state only when desired by an end user. In contrast, a user may have limited ability to control data on a simply duplicated volume, or to roll back or forward that volume to a desired state.

In some embodiments, a client may maintain multiple source volumes (e.g., for disaster recovery), with varying criteria as to how a cloud provider should update those volumes. For example, a client may create two source volumes in a "tick-tock" configuration, with each new snapshot being written to an alternative one of the two volumes. Similarly, a client may create three source volumes, each new snapshot being written one of the three volumes in rotation. A client may illustratively specify incremental restore criteria to the provider, such that the provider system, on detecting a new snapshot, programmatically selects a source volume and conducts a restore on the source volume using the new snapshot.

In some embodiments, a cloud provider system can further be configured to select a source volume to utilize in servicing an incremental snapshot restore request. For example, when a client requests an incremental restore of a target snapshot, the provider system may identify from a set of source volumes that source volume with a minimal difference to the target snapshot, and then conduct the restore using the identified source volume. This can enable clients to quickly conduct restore operations without specifying a particular source volume to use for the operation. For example, a client may maintain a cascading set of source volumes, such as one volume that reflects a snapshot one week old, another that reflects a snapshot one day old, and another that reflects a snapshot one hour old. The client may wish to conduct a restore operation for a snapshot anytime within the past week (or even older) and the cloud provider may programmatically determine which of these source volumes has a minimal delta to the target snapshot, and conduct an incremental restore using the determined source volume. In this way, clients are provided with the benefits of incremental restore with minimal responsibility for managing how that restore is conducted.

As will be appreciated by one of skill in the art in light of the present disclosure, the embodiments disclosed herein improve the ability of computing systems, such as cloud computing systems utilizing object-based snapshots, to conduct restore operations on those snapshots, by reducing or beneficially modifying data transfer required for such restore operations. Moreover, the presently disclosed embodiments address technical problems inherent within computing systems; specifically, the limited nature of computing resources that are required to transfer data in connection with a snapshot restore operation. These technical problems are addressed by the various technical solutions described herein, including the use of incremental restores for snapshots and the management of resources to facilitate such incremental restores. Thus, the present disclosure represents an improvement on computing systems utilizing object-based snapshots and computing systems in general.

The foregoing aspects and many of the attendant advantages of this disclosure will become more readily appreciated as the same become better understood by reference to the following description, when taken in conjunction with the accompanying drawings.

FIG. 1 depicts an example computing environment 100 including a cloud provider network 120 in which embodiments of the present disclosure can be implemented The cloud provider network 120 can be accessed by client computing devices 102 over a network 104. A cloud provider network 120 (sometimes referred to simply as a "cloud"), refers to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

The cloud provider network 120 may implement various computing resources or services, which may include a virtual compute service, data processing service(s) (e.g., map reduce, data flow, and/or other large scale data processing techniques), data storage services (e.g., object storage services, block-based storage services, or data warehouse storage services) and/or any other type of network based services (which may include various other types of storage, processing, analysis, communication, event handling, visualization, and security services not illustrated). The resources required to support the operations of such services (e.g., compute and storage resources) may be provisioned in an account associated with the cloud provider, in contrast to resources requested by users of the cloud provider network, which may be provisioned in user accounts.

In FIG. 1, the cloud provider network 120 includes one or more block store servers 105, one or more object storage servers 110, and one or more compute servers 115 that are in networked communication with one another and with the network 104 to provide users with on-demand access to computing resources including volumes 106, buckets 111, and instances 116, among others. These particular resources are described in further detail below. Some implementations of cloud provider network 120 can additionally include domain name services ("DNS") servers, relational database servers, servers providing serverless computing services, and other server services (not illustrated) for supporting on-demand cloud computing platforms. Each server includes hardware computer memory and/or processors, an operating system that provides executable program instructions for the general administration and operation of that server, and a computer-readable medium storing instructions that, when executed by a processor of the server, allow the server to perform its intended functions.

The cloud provider network 120 can provide on-demand, scalable computing platforms to users through the network 104, for example allowing users to have at their disposal scalable "virtual computing devices" via their use of the block store servers 105, object storage servers 110, and compute servers 115. These virtual computing devices have attributes of a personal computing device including hardware (various types of processors, local memory, random access memory ("RAM"), hard-disk and/or solid state drive ("SSD") storage), a choice of operating systems, networking capabilities, and pre-loaded application software. Each virtual computing device may also virtualize its console input and output ("I/O") (e.g., keyboard, display, and mouse). This virtualization allows users to connect to their virtual computing device using a computer application such as a browser, application programming interface, software development kit, or the like, in order to configure and use their virtual computing device just as they would a personal computing device. Unlike personal computing devices, which possess a fixed quantity of hardware resources available to the user, the hardware associated with the virtual computing devices can be scaled up or down depending upon the resources the user requires. Users can choose to deploy their virtual computing systems to provide network-based services for their own use and/or for use by their customers or clients.

The cloud provider network 120 can be formed as a number of regions, where a region is a separate geographical area in which the cloud provider clusters data centers. Each region can include two or more availability zones connected to one another via a private high speed network, for example a fiber communication connection. An availability zone (also known as an availability domain, or simply a "zone") refers to an isolated failure domain including one or more data center facilities with separate power, separate networking, and separate cooling from those in another availability zone. A data center refers to a physical building or enclosure that houses and provides power and cooling to servers of the cloud provider network. Preferably, availability zones within a region are positioned far enough away from one other that the same natural disaster should not take more than one availability zone offline at the same time. Customers can connect to availability zones of the cloud provider network via a publicly accessible network (e.g., the Internet, a cellular communication network) by way of a transit center (TC). TCs are the primary backbone locations linking customers to the cloud provider network, and may be collocated at other network provider facilities (e.g., Internet service providers, telecommunications providers) and securely connected (e.g. via a VPN or direct connection) to the availability zones. Each region can operate two or more TCs for redundancy. Regions are connected to a global network which includes private networking infrastructure (e.g., fiber connections controlled by the cloud provider) connecting each region to at least one other region. The cloud provider network may deliver content from points of presence outside of, but networked with, these regions by way of edge locations and regional edge cache servers. This compartmentalization and geographic distribution of computing hardware enables the cloud provider network to provide low-latency resource access to customers on a global scale with a high degree of fault tolerance and stability.

Turning specifically to the roles of the different servers within the cloud provider network 120, the compute servers 115 include one or more servers which provide resizable computing capacity to users for building and hosting their software systems. The compute servers 115 and associated control plane functionality can provide an elastic compute cloud service of the cloud provider network. Compute services can be referred to as a virtual compute service, or cloud compute service, in various implementations. Users can use the compute servers 115 to launch as many virtual computing environments, referred to as virtual compute instances, virtual machine instances, virtual machines, or "instances" 116, as they need. Instances 116 can have various configurations of processing power, memory, storage, and networking capacity depending upon user needs. The compute servers 115 can also include computer storage for temporary data used while an instance is running, however as soon as the instance is shut down this data may be lost.

The block store servers 105 provide persistent data storage for the compute servers 115 in the form of block storage volumes 106, each of which represents a virtualized, network-accessible block-storage device (e.g., a virtual "hard disk"). Block storage may be referred to in various implementations as cloud disks service, a managed disk service, a storage area network service, a persistent disk service, or a block volumes service, while block storage volumes may variously be referred to as cloud disks, storage disks, cloud volumes, disks, block volumes, or simply "volumes." The block store servers 105 and associated control plane functionality can provide an elastic block store service of the cloud provider network 120. Data of volumes 106 may be encrypted or unencrypted. Network-accessible block-storage devices may in some cases be end-user-accessible, for example by acting as a virtual disk drive for a virtual machine instance. In other instances, network-accessible block-storage devices may not be end-user accessible, but may be used to provide services to end users. For example, one or more network-accessible block-storage devices may be used as non-accessible recovery devices, supporting recovery to end-user-accessible block-storage devices.

The block store servers 105 include one or more servers on which data is stored as blocks. A block is a sequence of bytes or bits having a fixed length of the block size. Blocked data is normally stored in a data buffer and read or written a whole block at a time. Blocking can reduce overhead and speed up the handling of the data-stream. Each block is assigned a unique identifier by which it can be stored and retrieved, but typically is not assigned metadata providing further context. A block of data (also referred to herein as a "data block") can be, for example, 512 bytes, 1 kilobyte ("kB"), 4 kB, 8 kB, 16 kB, 32 kB, 64 kB, 128 kB, 256 kB, 512 kB, or larger, depending upon the implementation.

Volumes 106, which can be treated as an individual hard drive ranging for example from 1 GB to 100 terabytes TB (or more) in size, are made of one or more blocks stored on the block store servers 105. Although treated as an individual hard drive, it will be appreciated that a volume may be stored as one or more virtualized devices implemented on one or more underlying physical host devices. Volumes 106 may be partitioned a small number of times (e.g., up to 16) with each partition hosted by a device of the cloud provider network 120 that has the ability to transfer data at around 1 GB per second ("Gbps") in some implementations. These volumes provided persistent, dedicated storage that can be attached to particular instances of the compute servers 115. Each volume may be "attached" to an instance 116 running on a compute server 115, and can be detached from that instance 116 and re-attached to another. Attachment between a volume and an instance refers to the establishment of a connection between the instance—or other software or hardware acting on behalf of the instance—and the volume. This connection may be referred to as a "lease" in some implementations, and it enables to instance to view the volume as if it were a local storage drive, even though the volume and instance may be hosted on different physical machines and communicating over a network. Attachment may be facilitated, for example, by specialized hardware or software executing on compute servers 115 (which specialized hardware or software is sometimes referred to as a block store server "client") that operates to obtain mass storage operations (e.g., according to the Serial AT Attachment (SATA) protocol or other known storage protocols) and pass corresponding operations to the block storage services 105 for implementation, such that it appears from the point of view of an instance 116 that volumes 106 represent local disk drives. The block store server client may be implemented on an offload card of a server that includes the processing units (e.g., CPUs or GPUs) of the compute instance. For example, in some implementations, at least a subset of virtualization management tasks may be performed at one or more offload cards so as to enable more of the processing capacity of the host to be dedicated to client-requested compute instances—e.g., cards connected via PCI or PCIe to the physical CPUs and other components of the virtualization host may be used for some virtualization management components. Such an offload card of the host can include one or more CPUs that are not available to customer instances, but rather are dedicated to instance management tasks such as virtual machine management, input/output virtualization to network-attached storage volumes, local migration management tasks, instance health monitoring, and the like. The block store servers 105 may have built-in redundancy for volumes by replicating the volume across multiple servers within an availability zone, which means that volumes will not fail if an individual drive fails or some other single failure occurs.

The object storage servers 110 represent a distinct type of storage within the cloud provider network 120. The object storage servers 110 and associated control plane functionality can provide an object-based storage service of the cloud provider network. Object-based storage services can be referred to as a blob storage service, cloud object storage service, or cloud storage service, in various implementations. In contrast to block-based storage (e.g., where devices read and write fixed-length blocks identified by a location, such as a logical block address (LBA)), object storage services 110 facilitate storage of variable-length objects associated with a corresponding object identifier. Each object may represent, for example, a file submitted to the servers 110 by a user for storage (though the servers 110 may or may not store an object as a file). In contrast to block-based storage, where input/output (I/O) operations typically occur via a mass storage protocol like SATA (though potentially encapsulated over a network), interactions with the object storage servers 110 may occur via a more general network protocol. For example, the servers 110 may facilitate interaction via a Representational State Transfer (REST) application programming interface (API) implemented over the Hypertext Transport Protocol (HTTP). The object storage servers 110 may store objects within resources referred to as buckets 111. Each object typically includes the data being stored, a variable amount of metadata that enables various capabilities for the object storage servers 110 with respect to analyzing a stored object, and a globally unique identifier or key that can be used to retrieve the object. Objects stored on the object storage servers 110 are associated with a unique identifier, such that authorized access to them can be obtained through requests from networked computing devices in any location. Each bucket 111 is associated with a given user account. Users can store as many objects as desired within their buckets, can write, read, and delete objects in their buckets, and can control access to their buckets and the objects contained therein. Further, in embodiments having a number of different object storage servers 110 distributed across different ones of the regions described above, users can choose the region (or regions) where a bucket is stored, for example to optimize for latency. Users can use object storage servers 110 for purposes such as storing photos on social media websites, songs on music streaming websites, or files in online collaboration services, to name a few examples. Applications developed in the cloud often take advantage of the vast scalability and metadata characteristics of the object storage servers 110. The object storage servers 110 can support highly parallel data accesses and transfers. The object storage servers 110 can offer even greater redundancy than the block store servers 105, as the object storage servers 110 can automatically replicate data into multiple availability zones. The object storage servers 110 also have different data throughput than the block store servers 105, for example around 20 Mbps for a single stream of data.

While the object storage servers 110 can be used independently from the instances 116 and volumes 106 described above, they can also be used to provide data backup as described herein with respect to object-based snapshots (e.g., object-stored backups of volume data). For example, data of a volume 106 may be represented as one or more objects stored within the object storage servers 110 (with each object representing one or more blocks of the volume 106) along with one or more manifests identifying the objects. Together, the objects and manifests can logically represent a point-in-time representation of the volume 106 referred to herein as an object-based snapshot.

As illustrated in FIG. 1, the cloud provider network 120 can communicate over network 104 with client computing devices 102. The network 104 can include any appropriate network, including an intranet, the Internet, a cellular network, a local area network or any other such network or combination thereof. In the illustrated embodiment, the network 104 is the Internet. Protocols and components for communicating via the Internet or any of the other aforementioned types of communication networks are known to those skilled in the art of computer communications and thus, need not be described in more detail herein. Client computing devices 102 can include any network-equipped computing device, for example desktop computers, laptops, smartphones, tablets, e-readers, gaming consoles, and the like. Clients can access the cloud provider network 120 via the network 104 to view or manage their data and computing resources, as well as to use websites and/or applications hosted by the cloud provider network 120. While shown as distinct in FIG. 2, elements of the cloud provider network 120 may also act as clients to other elements of that network 120. Thus, a client device 102 can generally refer to any device accessing a network-accessible service as a client of that service.

Figure 2:
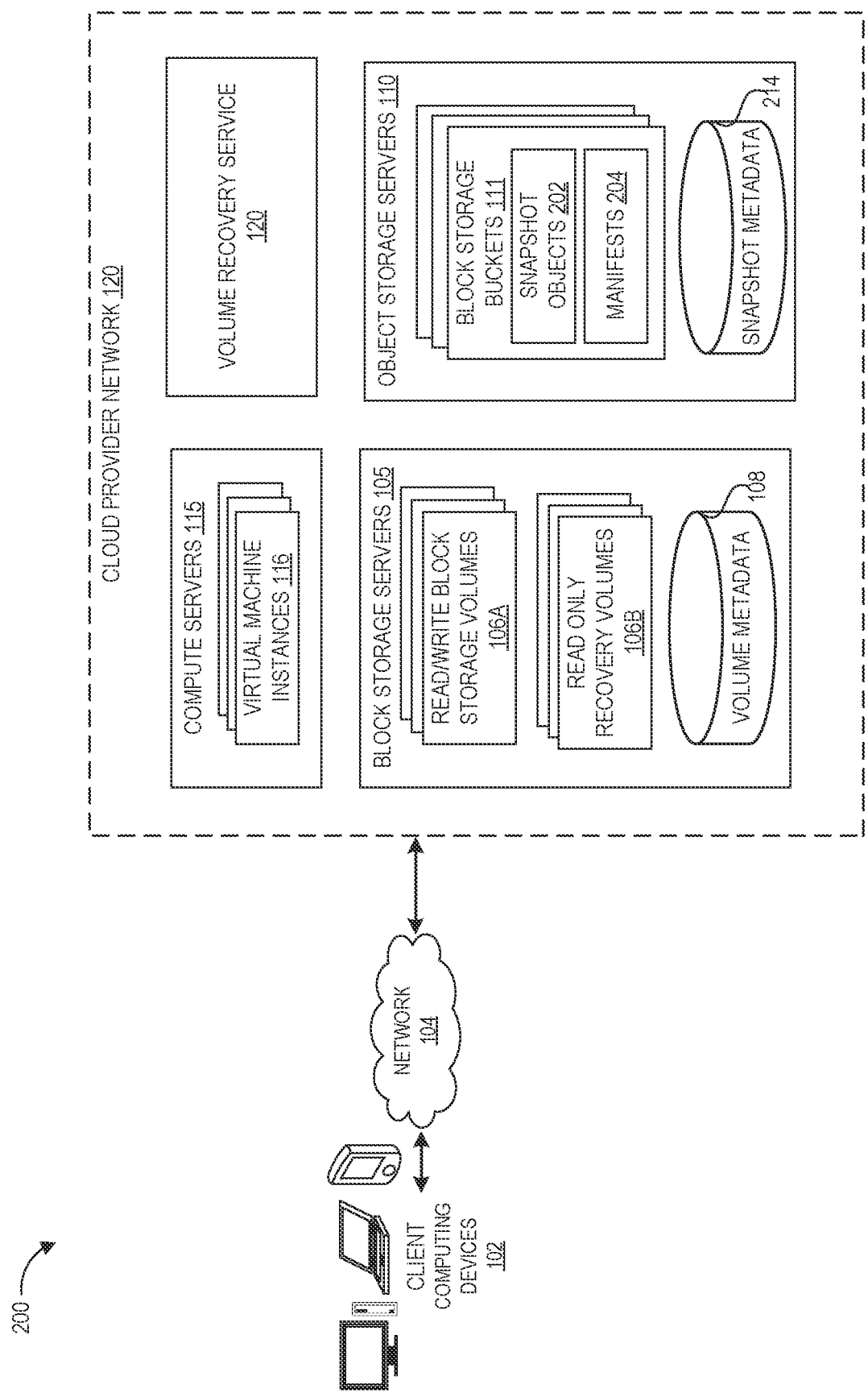
FIG. 2 depicts a schematic diagram of a network environment in which the cloud provider network of FIG. 1 implements incremental restore operations for block storage volumes, and provides a volume recovery service to manage such operations.

FIG. 2 depicts a computing environment 200 in which a volume recovery service 210 is implemented on the cloud provider network 120. The volume recovery service 210 can implement a variety of volume recovery tasks, such as managing (e.g., creating and updating) a set of source volumes to be used for recovery of volume data, handling requests to restore volume data from an object-based snapshot, selecting a source volume to be used for that restoration, etc. For example, in FIG. 2 block storage servers 105 may support at least two types of volumes: read/write block storage volumes 106A, which represent volumes to which data can be written, and read only recovery volumes 106B, which represent volumes that are not writable by client computing devices 102. A client may interact with the volume recovery service 210 to create one or more read only recovery volumes 106B to support recovery of data within a read/write block storage volume 106A, such as due to failure of that volume 106A. Illustratively, a client may specify that the volume recovery service 120 should maintain a read only recovery volume 106B matching the state of a most recent snapshot for a read/write block storage volume 106A, should maintain multiple volumes 106B matching the last n snapshots, etc. The volume recovery service 120 may monitor snapshots stored within the object storage services 110, and create or maintain read only recovery volumes 106B based on those snapshots. While object storage services 110 are one example data store for storing object-based snapshots, embodiments of the present disclosure may use any of a variety of known network-accessible data stores. As shown in FIG. 2, the block storage services 105 may also maintain volume metadata 108 indicating information for each volume 106, such as a source snapshot from which the volume was created. Metadata 108 may also include, for example, write logs for volumes 106 indicating blocks written since the source volume was set.

To facilitate updating read only recovery volumes 106B based on snapshots, the block storage services 105 can support incremental snapshot restore operations, in which a snapshot restore operation can be completed based on retrieval of only a delta between a target snapshot (being restored) and a source snapshot for a source volume (e.g., a read only recovery volume 106B). The object storage services 110 can illustratively maintain information used to identify that delta. For example, the services 110 may store snapshot metadata 214 indicating relationships between various snapshots, such as organized into a hierarchy (e.g., a tree data structure) that associates snapshots by lineage from a root snapshot. As discussed above, each snapshot may be stored as a set of objects 202 within block storage buckets 111, along with a manifest 204 for the snapshot that lists objects of the snapshot. By comparing the manifests 204 for two snapshots (e.g., using lineage information from the snapshot metadata), the delta in terms of block differences between two snapshots can be identified. Thus, by knowing the source snapshot for a read only recovery volume 106B and a target snapshot specified within an incremental restore operation, the block storage servers 105 can identify the delta between the target and source snapshot, and satisfy the incremental restore operation request by retrieving those blocks from the object storage servers 110 (e.g., by retrieving the objects 202 containing those blocks) and writing those blocks to a target volume. Where the target volume is a read only recovery volume 106B, no further data transfer may be required. Instead, the server 105 may mark the previously read only recovery volume 106B as writable, transforming it into a read/write block storage volume 106A. Where the target volume is a new volume (e.g., a newly created read/write block storage volume 106A), the remaining data of the target snapshot can be retrieved from the read only recovery volume 106B, which may be accessible to the target volume via a faster network connection than between the target volume and the object storage services 110 (e.g., in terms of more bandwidth, lower latency, or a combination thereof). Thus, the target volume can be restored to match the data in the target snapshot without requiring that all data of the target snapshot be transferred from the object storage servers 110.

While FIG. 2 depicts read/write block storage volumes 106A and read only recovery volumes 106B as distinct, some embodiments may enable read/write block storage volumes 106A to be used as recovery volumes. For example, as noted above the servers 105 may maintain a write log for each volume 106 indicating blocks written to since the source snapshot for the volume was set. Any such blocks may be included within the set of blocks retrieved from a target snapshot during an incremental restore operation, thus enabling incremental restore without requiring that the source volume contain data identical to a source snapshot. Accordingly, examples using a read only recovery volume 106B are illustrative in nature and it should be understood that these examples could be modified to utilize a read/write block storage volume 106A that provides for write logging.

Figure 3:
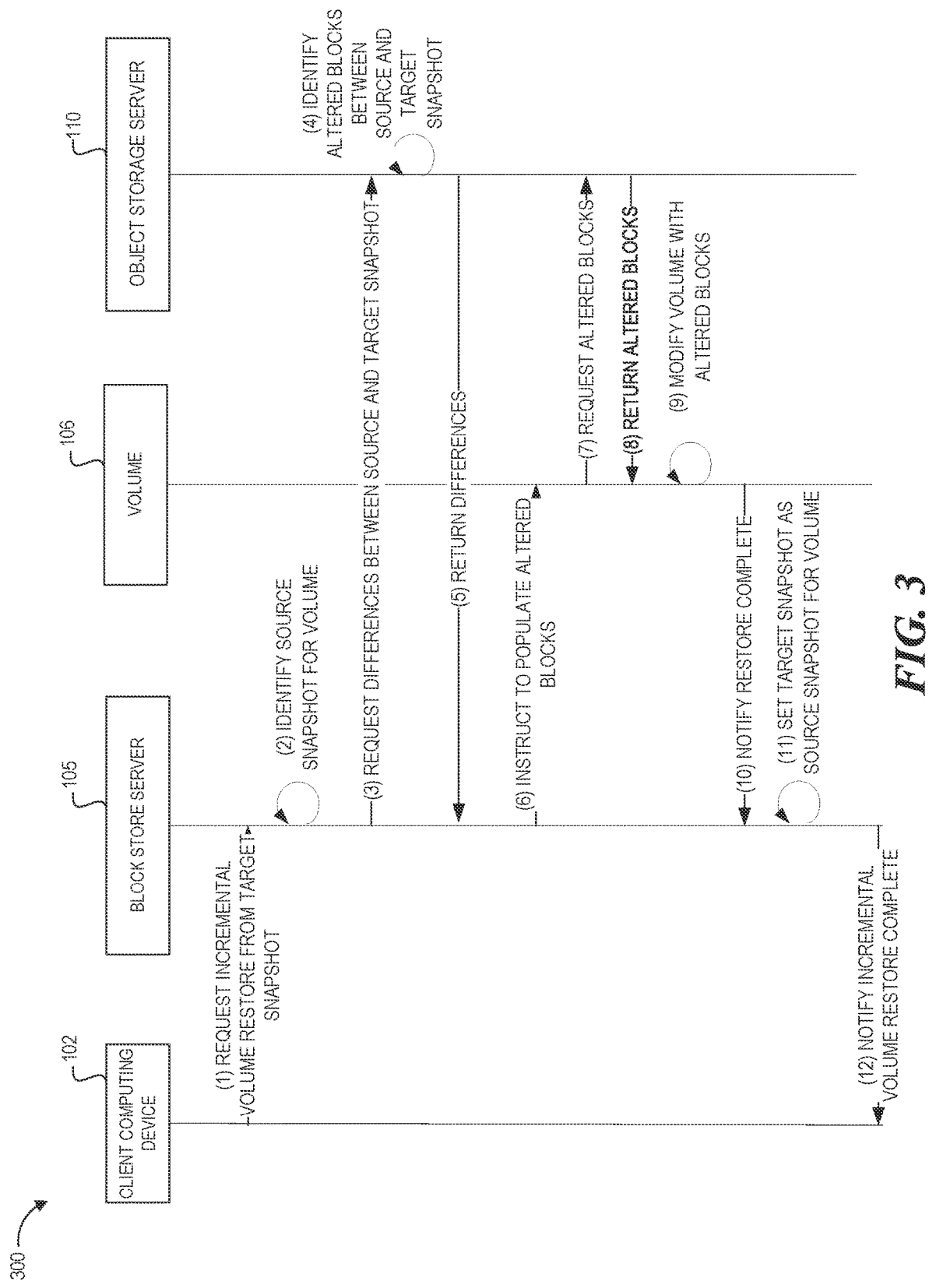
FIGS. 3 and 4 depict illustrative interactions on the cloud provider network of FIG. 1 to conduct incremental restore operations for a block storage volume.

FIG. 3 depicts illustrative operations in the environment of FIG. 2 to conduct an incremental restore operation to a target volume corresponding to a known source snapshot, in order to modify the target volume to contain data of a target snapshot. For example, assume that a client has created a read only recovery volume 106B, whose data matches a known source snapshot. Further assume that a different target snapshot exists, and that the client wishes to modify the volume 106B to contain data of the target snapshot ("restoring" the snapshot to the target volume). The source and target snapshot may be related in a lineage (e.g., with one being an ancestor or predecessor of another, with the snapshots being siblings or cousins, etc.) or unrelated. Thus, the interactions of FIG. 3 may be used to "roll back" a volume to a past state, "roll forward" a volume to a newer state, or otherwise modify the volume to match a target snapshot.

The interactions of FIG. 3 begin at (1), where a client computing device 102 submits a request to the block store servers 105 to restore a volume from a target snapshot using incremental restore. The client computing device 102 may be a device of an end user, or may be the volume recovery service 120 of FIG. 2 (e.g., acting based on the interactions of FIGS. 5-6, discussed in more detail below). In FIG. 3, it is assumed that the request specifies a particular target volume to which to restore the target snapshot, and that the target volume already contains data corresponding to another snapshot. Thus, the request of FIG. 3 is a request to modify the target volume such that it contains data of the target snapshot. In accordance with the technique of incremental restoration, the interactions of FIG. 3 can conduct this modification while transferring only required blocks from the target snapshot, as opposed to rewriting the entire volume.

At (2), the block store server 105 identifies the source snapshot for the volume. As noted above, the block store server 105 may store metadata for each volume indicating a source snapshot for the volume, indicating that the source snapshot was previously restored to the volume (either through full or incremental restore). Each snapshot may be identified, for example, based on a globally unique identifier (GIUD).

At block (3), the block store server 105 requests from the object storage server 110 a listing of block differences between the source and target snapshot. The server 110 then, at (4), identifies those differences. As noted above, the object storage server 110 may identify differences based on a variety of techniques. For example, the server 110 may maintain, for each snapshot, a manifest indicating objects of the snapshot. The server 110 may thus compare the manifests for two snapshots and identify differences based on the different objects in each manifest (where a given different object indicates that the one or more blocks stored in that object are different between the two snapshots). Where two snapshots are related in lineage (e.g., as part of the same lineage tree), the server 110 may identify different based on the relationship between the two snapshots. For example, the server 110 may maintain information identifying differences between a parent and child snapshot, and may combine differences for each generationally link in a lineage tree between the two snapshots, in order to determine total differences between two snapshots. On identifying the differences, the server 110 returns a listing of the differences at (5). The listing may include for example a listing of blocks (e.g., as identifiers, such as block 1, block 2, etc.), a listing of objects in the snapshot that contain altered blocks, or both.

At (6), the block store server 105 instructs the target volume 106 to populate the altered blocks from the target snapshot to the volume 106. In some instances, the server 105 may also instruct the volume 106 to populate additional blocks. For example, where the volume 106 is a read/write volume, the server 105 may identify (based, e.g., on write logs for the volume 106) a set of blocks written on the volume 106 since the source snapshot for the volume 106 was set, and may instruct the volume 106 to populate those written-to blocks in addition to the blocks identified by the object storage server 110.

Thereafter, the volume 106 begins to "hydrate" the target snapshot, by retrieving and storing the altered blocks in the volume 106. This process may also be referred to as "populating" the volume with the altered blocks. More specifically, at (7), the volume 106 requests the altered blocks from the object storage server 110, which are returned in turn at (8). At (9), the volume 106 modifies itself with the altered blocks, by writing the altered blocks to their respective locations in the volume 106. Thus, any blocks in the source snapshot that are different from those in the target snapshot are altered in the volume to match the target snapshot. As a result, the volume 106 contains data matching the target snapshot, without requiring that the entirety of the target snapshot be retrieved from the object storage server 110.

In some instances, snapshots on the object storage server 110 may be sparse, such that they implicitly (rather than explicitly) store unwritten blocks (e.g., by simply omitting such blocks from the snapshot or otherwise indicating that such blocks are unwritten). When a snapshot does not include an object representing one or more blocks, or when the object store server 110 otherwise indicates that such blocks are unwritten, the block store server 105 may assume that these blocks hold a specific data pattern corresponding to unwritten blocks on the volume 106 (e.g., a series of zeros). In such instances, the interactions of FIG. 3 may be modified to account for sparse snapshots. For example, interactions (7) and (8) may be modified such that the object storage service 110 can notify the volume 106 of blocks not explicitly stored within the snapshot (e.g., unwritten), and the volume 106 in turn can instead write the specific data pattern to such blocks. Unwritten blocks may be particularly likely in instances when the target snapshot is a parent of the source snapshot (e.g., when a volume 106 is being "rolled back" to an earlier state).

Accordingly, at (10), the volume 106 notifies the block store server 105 that a restore of the target snapshot is complete. The server 105 therefore at (11) modifies metadata of the volume 106 to indicate that the target snapshot has become the new source snapshot for the volume. The server 105 then, at (12), notifies the client computing device 102 that the incremental restore is complete. In some embodiments, such as where the source volume was previously set as read only, the server 105 may additionally modify the volume to be writable, thus enabling the client 102 to use the volume, e.g., as a virtual storage drive for an instance.

Figure 4:
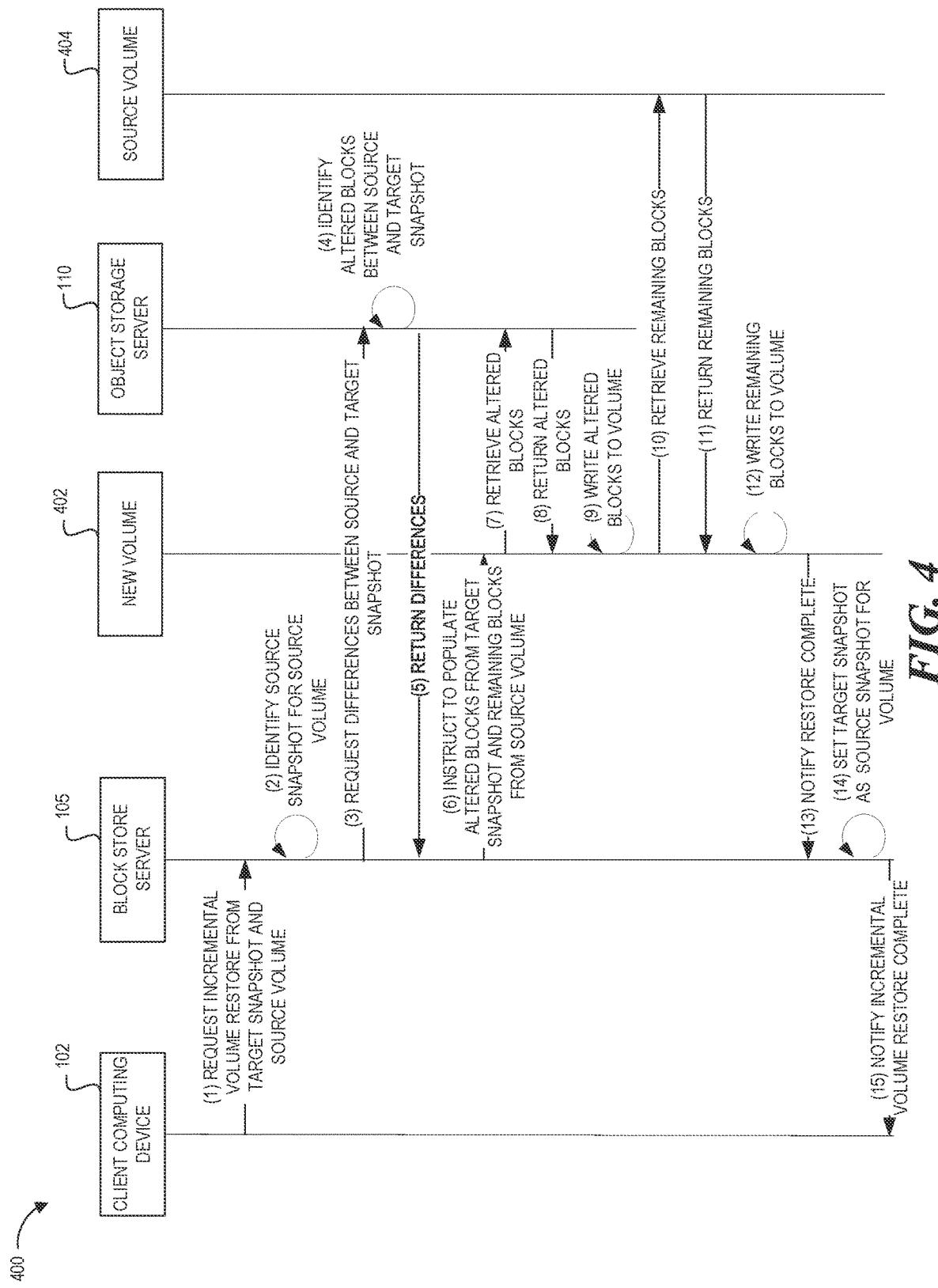

FIG. 4 depicts illustrative operations similar to those of FIG. 3. Like those of FIG. 3, the interactions of FIG. 4 are undertaken in the environment of FIG. 2 to conduct an incremental restore operation with respect to a target snapshot, based on an existing volume whose data corresponds to a source snapshot. However, unlike the interactions of FIG. 3, the interactions of FIG. 4 do not relate to modifying the existing volume. Rather, the interactions of FIG. 4 depict how a new volume 402 can be created from both a target snapshot and an existing volume (the source volume 404), in order to more quickly create the new volume or more quickly place the new volume in a useable state. Beneficially, the interactions of FIG. 4, in not writing to the existing volume, can enable the existing volume to continue to be used for future restore operations in its present state.

Many interactions of FIG. 4 are the same or substantially similar to interactions of FIG. 3, and thus will not be re-described in detail. For example, interactions (1)-(5) of FIG. 4 are substantially similar to interactions (1)-(5) of FIG. 3.

Interaction (6) of FIG. 4 differs from interaction (6) of FIG. 3, in that the block store server 105 instructs the new volume 402 (which may be a preexisting volume, or may be created by the block store server 105 during the interactions of FIG. 4) to populate both from the object storage server 110 and from the source volume 404. More specifically, the blocks retrieved from the object storage server 110 are those identified as different between a target snapshot being restored and a source snapshot for the source volume 404. The blocks retrieved from the source volume 404 are those remaining blocks of the target snapshot, which are the same between the target snapshot and the source snapshot for the source volume 404, and are thus duplicated in the target snapshot and the source volume 404. As noted above, retrieval of blocks from a source volume 404 may be preferential, for example, due to throughput of the source volume 404 or performance of the network connection between the source volume 404 and the new volume 402.

Accordingly, at interactions (7)-(12), the new volume 402 retrieves the blocks from their respective locations of the object storage server 110 and the source volume 404. Interactions (7)-(9) in FIG. 4 are similar to interactions (7)-(9) in FIG. 3. Interactions (10)-(12) of FIG. 4 are also similar to interactions (7)-(9) of FIG. 3, except that the blocks are retrieved from the source volume 404, rather than the object storage server 110. By combining data from the target snapshot and source volume 404, the new volume 402 can be placed in a state such that it contains data matching that of the target snapshot, without requiring that all blocks of the target snapshot be retrieved from the object storage server 110. Thus, at (13), the new volume 402 can notify the block store server 105 that incremental restore of the volume is complete. The server 105 can then update the source snapshot for the volume and notify the client, at interactions (14) and (15).

In some embodiments, the block store server 105 is configured during the interactions of FIGS. 3 and 4 to take appropriate action to ensure that blocks on a volume being read from or written to are not otherwise altered by other actors. For example, the block store server 105 may "lock" a source or destination volume to ensure such other modifications are not made. Should a lock already exist on a volume, the block store server 105 may in some embodiments issue an error, rather than carrying out the interactions of FIGS. 3-4. Such locks may be used on any appropriate source or destination volume to ensure data integrity of the block store service.

As noted above, the incremental restore enabled by the block store server 105 can provide a variety of benefits to end users. While the server 105 may make incremental restore available directly to end users, a cloud provider may additionally or alternatively use incremental restore as an underlying technology to support other services, such as the volume recovery service 120. For example, the volume recovery service 120 may enable end users to request creation of a read only recovery volume 106B supporting incremental restore (as a source volume), and to specify criteria for maintaining that read only recovery volume 106B. Illustratively, an end user may specify that a read only recovery volume 106B be created and that incremental restore be used to constantly maintain the volume 106B in a state matching a most recent snapshot of another volume. This can provide for effectively duplicating the other volume at the time of each snapshot, while maintaining existing advantages of object-based snapshots as well. In another example, an end user may request that multiple read only recovery volumes 106B be created, and that snapshots be restored to them in a rotating fashion. For example, three read only recovery volumes 106B may be maintained in states matching the three most recent snapshots of a production volume, or matching other combinations of snapshots of the production volume (e.g., a weekly snapshot, a daily snapshot, an hourly snapshot, etc.). In this way, the volume recovery service 120 can programmatically build and maintain read only recovery volumes 106B on behalf of users.

Figure 5:
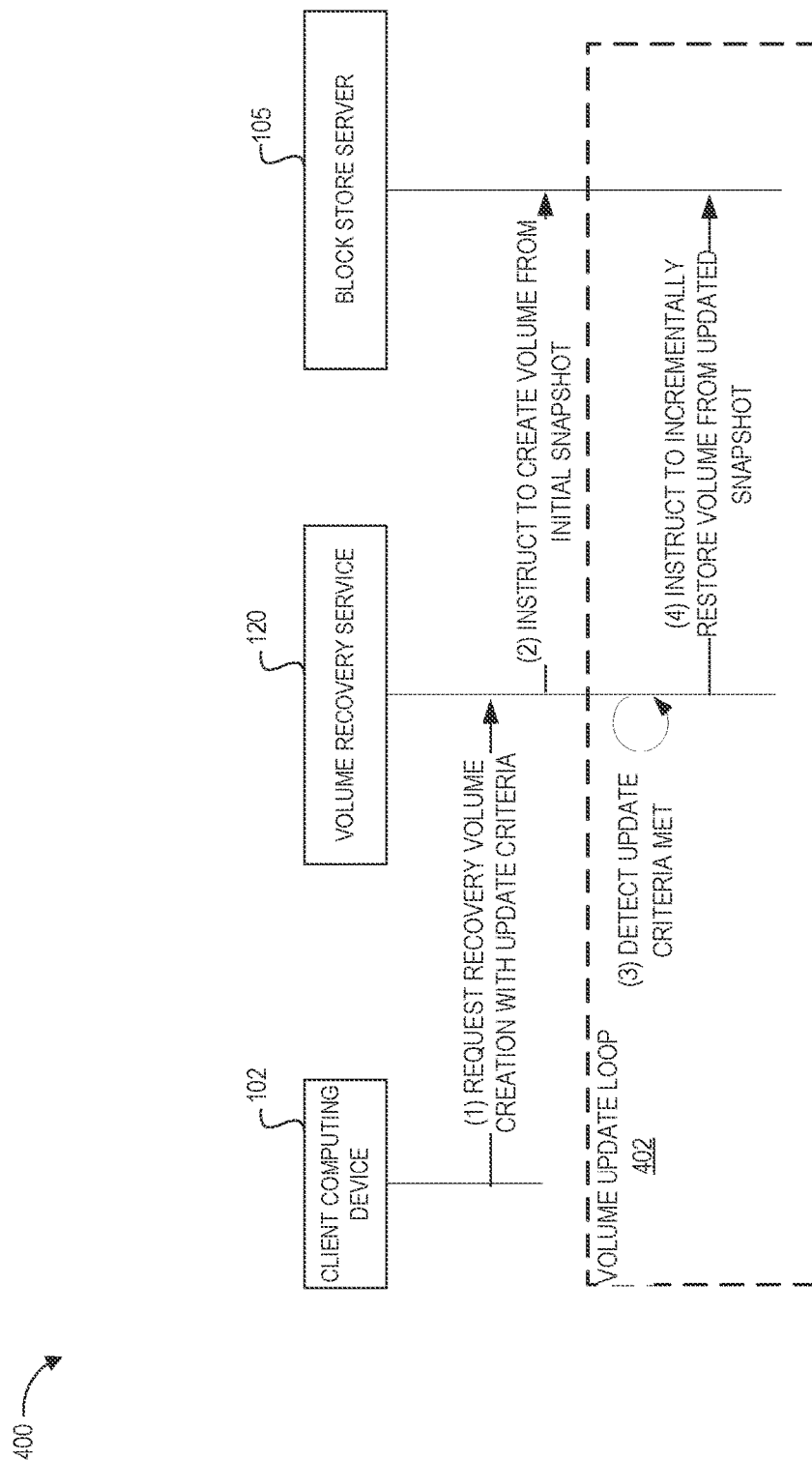
FIG. 5 depicts illustrative interactions on the cloud provider network of FIG. 1 to create a recovery volume and to update that recovery volume using incremental restore operations based on user-specified criteria.

Interactions for programmatically building and maintaining read only recovery volumes 106B on behalf of end users are shown in FIG. 5. Specifically, FIG. 5 depicts interactions enabling an end user to request creation of a read only recovery volume 106B, and to specify criteria for how that read only recovery volume 106B should be updated based on new snapshots to another volume (e.g., a production volume).

The interactions of FIG. 5 begin at (1), where a client computing device 102 requests that a recovery volume be created, and specifies update criteria for the recovery volume. The update criteria may be based on creation of snapshots for an existing volume, based on time, or based on other parameters. For example, the criteria may specify that each time a new snapshot is created for an existing volume, the snapshot should be incrementally restored to the recovery volume. Alternatively, the criteria may specify that each specific time period (e.g., each day) a newest snapshot for an existing volume should be incrementally restored to the recovery volume. In some cases, time and snapshot criteria can be combined. For example, the criteria may specify that a new snapshot for an existing volume should be incrementally restored to a recovery volume if the time since a last incremental restore to the recovery volume is more than a threshold amount. While FIG. 5 depicts creation and management of a single read only recovery volume 106B, in some cases these interactions may be modified to support creation of multiple read only recovery volumes 106B. For example, an end user may specify that two, three, four, or more recovery volumes are created, and may specify criteria for updating each recovery volume based on snapshots to an existing volume. Illustratively, the criteria may specify a rotation, such that each new snapshot to an existing volume is written to a different recovery volume of the set of volumes in a rotating manner.

At (2), the volume recovery service 120 instructs the block store server 105 to create the read only recovery volume 106B. Initially, the read only recovery volume 106B may be populated based on an initial snapshot identified based on the request from the client computing device 102. The initial snapshot illustratively corresponds to the existing volume specified in the criteria of the request. Where multiple snapshots of the existing volume exist, the particular snapshot used may vary based on the update criteria. For example, where a client requests creation of a single read only recovery volume 106B, the latest snapshot of the existing volume may be used as an initial snapshot for the read only recovery volume 106B. Where a client requests three read only recovery volume 106B, the latest three snapshots may be used to populate respective recovery volumes 106B. In other instances, a client may manually specify the initial snapshot used to populate the read only recovery volume 106B. As the read only recovery volume 106B is newly created, the block store server 105 may implement a "full" restore of the initial snapshot to the read only recovery volume 106B, copying blocks of the initial snapshot from the object storage server 110 to the new read only recovery volume 106B.

While FIG. 5 depicts creation of a new read only recovery volume 106B, in some embodiments a client request may specify an existing read only recovery volume 106B to use as a recovery volume. In such instances, the block store server 105 may implement an incremental restore of the initial snapshot to the read only recovery volume 106B.

Thereafter, the volume recovery service 120 can act to maintain the volume according to the update criteria, by detecting when the update criteria have been met, and appropriately updating the volume using incremental restore operations. Interactions to detect when update criteria have been met and to incrementally restore the volume are shown as volume update loop 402.

Within the volume update loop 402, at (3), the volume recovery service 120 detects that update criteria for the read only recovery volume 106B is met. For example, the volume recovery service 120 may communicate with the object storage server 110 to detect when a new snapshot for an existing volume has been created, and verify that this snapshot satisfies criteria for updating the read only recovery volume 106B. Illustratively, where multiple read only recovery volumes 106B are created and updated in a rotating manner, the service 120 may detect that this is the nth new snapshot for the existing volume, where n corresponds to a location of a given read only recovery volume 106B within the rotation (e.g., the $3^{rd}$ new snapshot results in updating the third read only recovery volume 106B). Accordingly, at (4), the volume recovery service 120 instructs the block store server 105 to incrementally restore the new snapshot to the read only recovery volume 106B, updating the read only recovery volume 106B to match the data within the new snapshot. In this way, the read only recovery volume 106B can be maintained in a known state, facilitating future volume recovery either by direct use of the read only recovery volume 106B, or by incrementally restoring a different snapshot to the read only recovery volume 106B.

As discussed above, in some instances end users may create multiple read only recovery volumes 106B in various different states corresponding to various different snapshots. In such cases, it may be desirable to relieve the end user from manually selecting which read only recovery volume 106B to use to recover a target snapshot. Instead, the volume recovery service 120 can be configured to obtain a request to recover a snapshot, and to programmatically select a most appropriate read only recovery volume 106B to use as a source volume for that recovery, based on a delta between the source volume and the target snapshot. Interactions for that programmatic selection are shown in FIG. 6.

Figure 6:
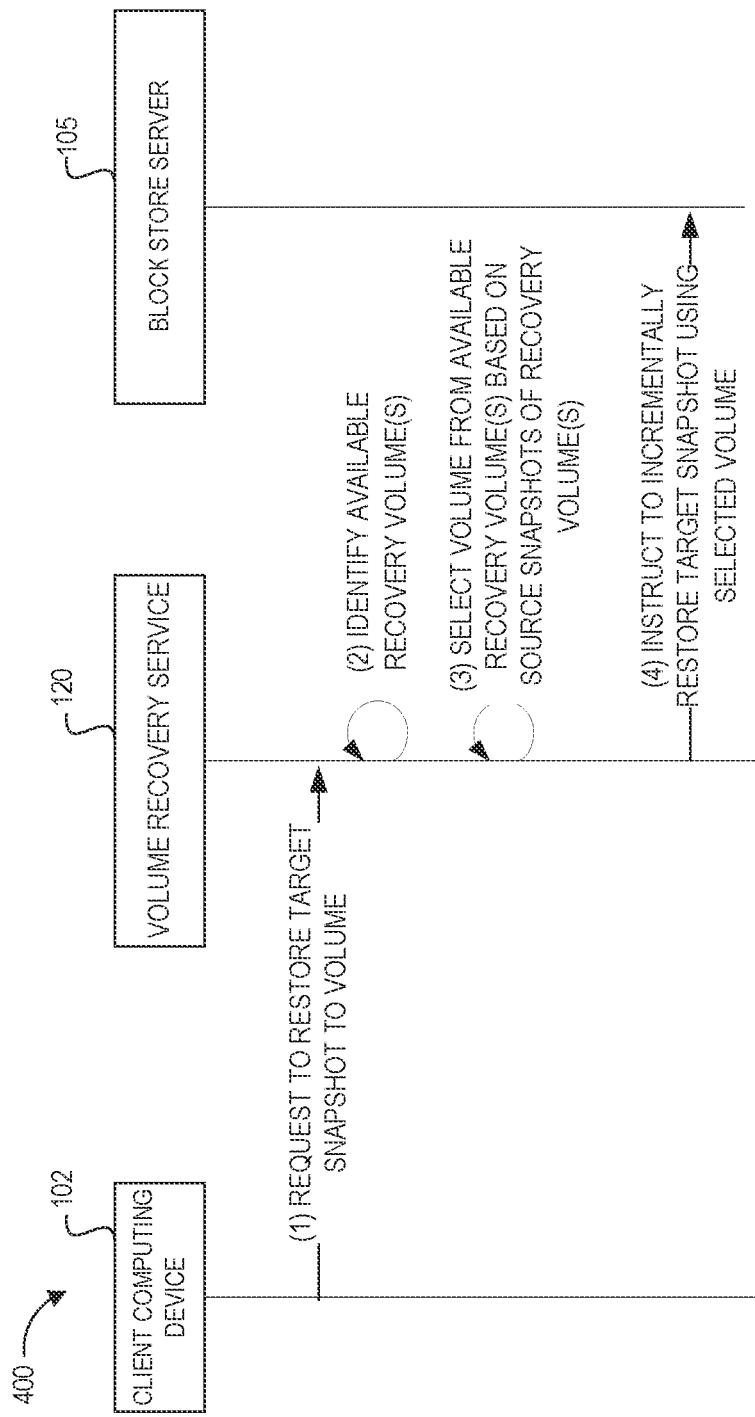
FIG. 6 depicts illustrative interactions on the cloud provider network of FIG. 1 to conduct a recovery operation from a set of available recovery volumes using incremental restore.

The interactions of FIG. 6 begin at (1), where a client computing device 102 requests to restore a target snapshot to a volume. The request may illustratively be to modify an existing recovery volume (not specified within the request), such as according to the interactions of FIG. 3, or to create or modify a different volume, by hydrating the volume with both the target snapshot and data from an existing recovery volume, such as according to the interactions of FIG. 4.

At (2), the volume recovery service 120 identifies available recovery volumes for the client device 102, such as the set of read only recovery volumes 106B associated with an account of the client device. At (3), the volume recovery service 120 selects from the available recovery volumes based on the source snapshots of the recovery volumes. As noted above, the block store servers 105 may maintain metadata for each volume indicating a source snapshot of the volume. Accordingly, for each volume, the service 120 may determine the source snapshot from the metadata, and then determine a delta between the source snapshot and the target snapshot, such as by querying the object storage service 110 for this delta in a manner similar to interactions (3)-(5) of FIG. 3. The volume recovery service 120 then illustratively selects a recovery volume with a minimal delta (e.g., the volume with a source snapshot that is most overlapping in data with the target snapshot). In cases where the recovery volumes are writable, the service 120 may further account for writes to the recovery volumes, by considering the delta for the volume as a combination of writes to the volume and the difference between source and target snapshots. Accordingly, the service 120 can identify a recovery volume that is closest to the target snapshot in terms of data stored.

Thereafter, at (4), the service 120 instructs the block store server 105 to incrementally restore the target snapshot using the selected volume as a source volume for the operation. The incremental restore may be conducted, for example, as discussed above with respect to FIGS. 3 and 4.

Figure 7:
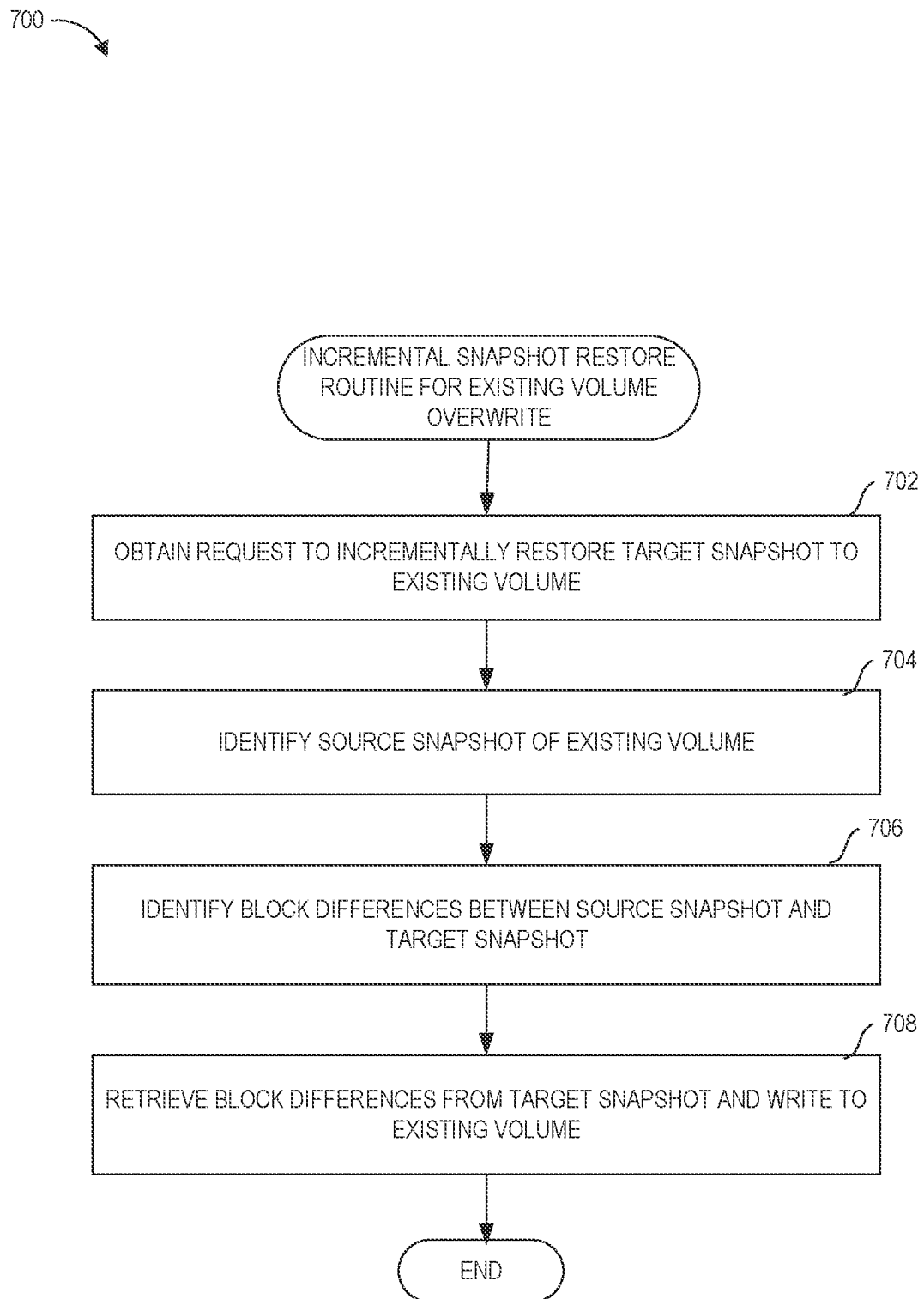
FIG. 7 depicts routine implemented on the cloud provider network of FIG. 1 to conduct an incremental restore operation by overwriting an existing storage volume.
Figure 8:
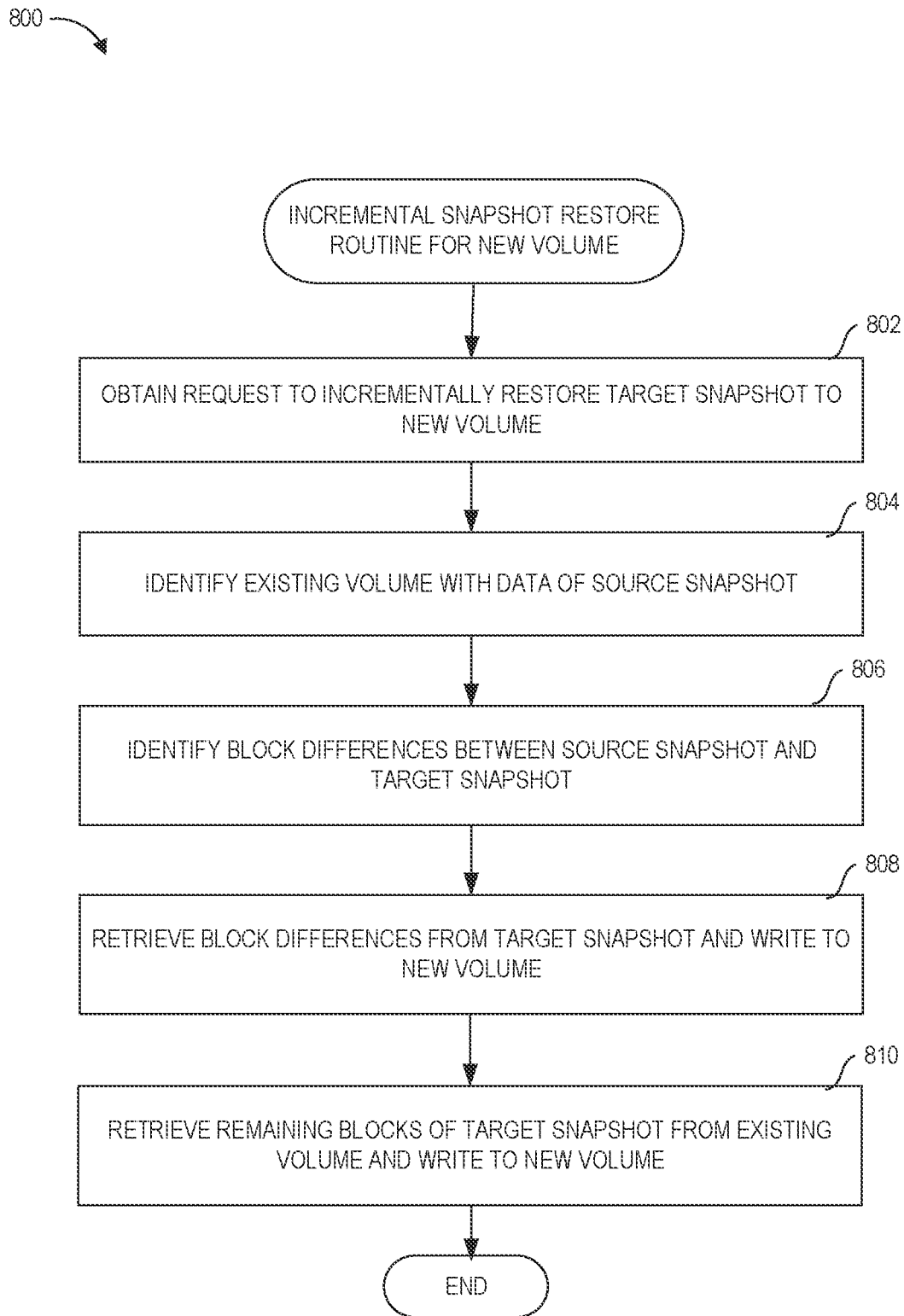
FIG. 8 depicts routine implemented on the cloud provider network of FIG. 1 to conduct an incremental restore operation by populating a storage volume with data from an existing storage volume and a snapshot.

With reference to FIGS. 7 and 8, illustrative routines will be described for conducting incremental restore. Specifically, FIG. 7 depicts an illustrative routine 700 for conducting incremental restore to an existing volume with data corresponding to a source snapshot. FIG. 8 depicts an illustrative routine 800 for conducting an incremental restore to a new volume, based on an existing volume with data corresponding to a source snapshot. The routines 700 and 800 may be carried out, for example, by the block store servers 105 of FIG. 1.

With reference to FIG. 7, the routine 700 begins at block 702, where the block store servers 105 obtain a request to incrementally restore a target snapshot to an existing volume. In some instances, the request may be received from an end user, such as via an application programming interface (API) or other interface provided by the block store servers 105. In other instances, the request may be received from other non-end user devices, such as from the volume recovery service 120. The request illustratively specifies the target snapshot and the existing volume.

At block 704, the block storage servers 105 identify a source snapshot of the existing volume. As noted above, the servers 105 may maintain metadata for a volume indicating a snapshot used to create the volume, and thus indicating that the volume contains data corresponding to the source snapshot. In the instance that the volume is read only, the volume data can be expected to match the source snapshot. In the instance that the volume is writable, the volume data may differ from the source snapshot, but the servers 105 may maintain records (e.g., write logs) that indicate those blocks that have been written to, and are thus expected to potentially differ from the source snapshot.

At block 706, the block store servers 105 identify block differences between the source snapshot and the target snapshot. Illustratively, the servers 105 may transmit a request to the object store servers 110 hosting the snapshots to identify the differences. As discussed above, block differences can be identified based on lineage of snapshots, manifests for the snapshots, or a combination thereof.

At block 708, the block store servers 105 retrieve the block differences identified at block 708 from the target snapshot, and write the block differences to the existing volume. In the case that the existing volume has been written to since being in a state matching the source snapshot, the written-to blocks can additionally be retrieved and written. Thus, the data of the existing volume can be expected to match the target snapshot, without requiring that all data of the target snapshot be retrieved from the object store servers 110. The routine 700 then ends.

As noted above, FIG. 8 depicts a routine 800 for conducting an incremental restore to a new volume, based on an existing volume with data corresponding to a source snapshot. The routine 800 is therefore similar to the routine 700, but varies in that the incremental restore is not conducted by writing to an existing volume. As discussed below, in some implementations, the routine 800 may therefore proceed without specification of the existing volume to use to support the incremental restore.

With reference to FIG. 8, the routine 700 begins at block 802, where the block store servers 105 obtain a request to incrementally restore a target snapshot to a new volume. In the context of FIG. 8, "new volume" may refer to a volume created in connection with the request or created just prior to handling the request. "New volume" may also refer to an existing volume with data that is unneeded, and may thus be overwritten during implementation of the routine 800. In some instances, the request may be received from an end user, such as via an application programming interface (API) or other interface provided by the block store servers 105. In other instances, the request may be received from other non-end user devices, such as from the volume recovery service 120. The request illustratively specifies the target snapshot.

At block 804, the block storage servers 105 identify an existing volume to use to support the incremental restore, which existing volume is associated with a source snapshot. In some instances, the existing volume is identified from the request, which request specifies an existing volume to use to support the incremental restore. In other instances, the request does not specify an existing volume, thus enabling the block store servers 105 to select an existing volume. The block store servers 105 may thus implement interactions such as interactions (2) and (3) of FIG. 6 to identify an existing volume. More specifically, the servers 105 may identify a set of recovery volumes associated with the request (e.g., those of the account associated with the recovery operation), and identify from the recovery volumes a volume with a minimal difference to the target snapshot. This volume may then be used to support the incremental recovery.

At block 806, the block store servers 105 identify block differences between the source snapshot and the target snapshot. Illustratively, the servers 105 may transmit a request to the object store servers 110 hosting the snapshots to identify the differences. As discussed above, block differences can be identified based on lineage of snapshots, manifests for the snapshots, or a combination thereof.

At block 808, the block store servers 105 retrieve the block differences identified at block 708 from the target snapshot, and write the block differences to new existing volume. In the case that the existing volume supporting incremental restore has been written to since being in a state matching the source snapshot, the written-to blocks can additionally be retrieved and written. In addition, at block 810, the block store servers 105 retrieve remaining blocks of the target snapshot from the existing volume identified at block 804, and write the remaining blocks to new existing volume. For example, if the target snapshot has a set of blocks numbered 1 to 200, and blocks 1-20 differ between the source snapshot of the existing volume and the target snapshot, then block 808 would involve retrieving blocks 1-20 from the target snapshot, and retrieving blocks 21-200 from the existing volume. Thus, the data of the new volume can be expected to match the target snapshot, without requiring that all data of the target snapshot be retrieved from the object store servers 110. The routine 800 then ends.

Figure 9:
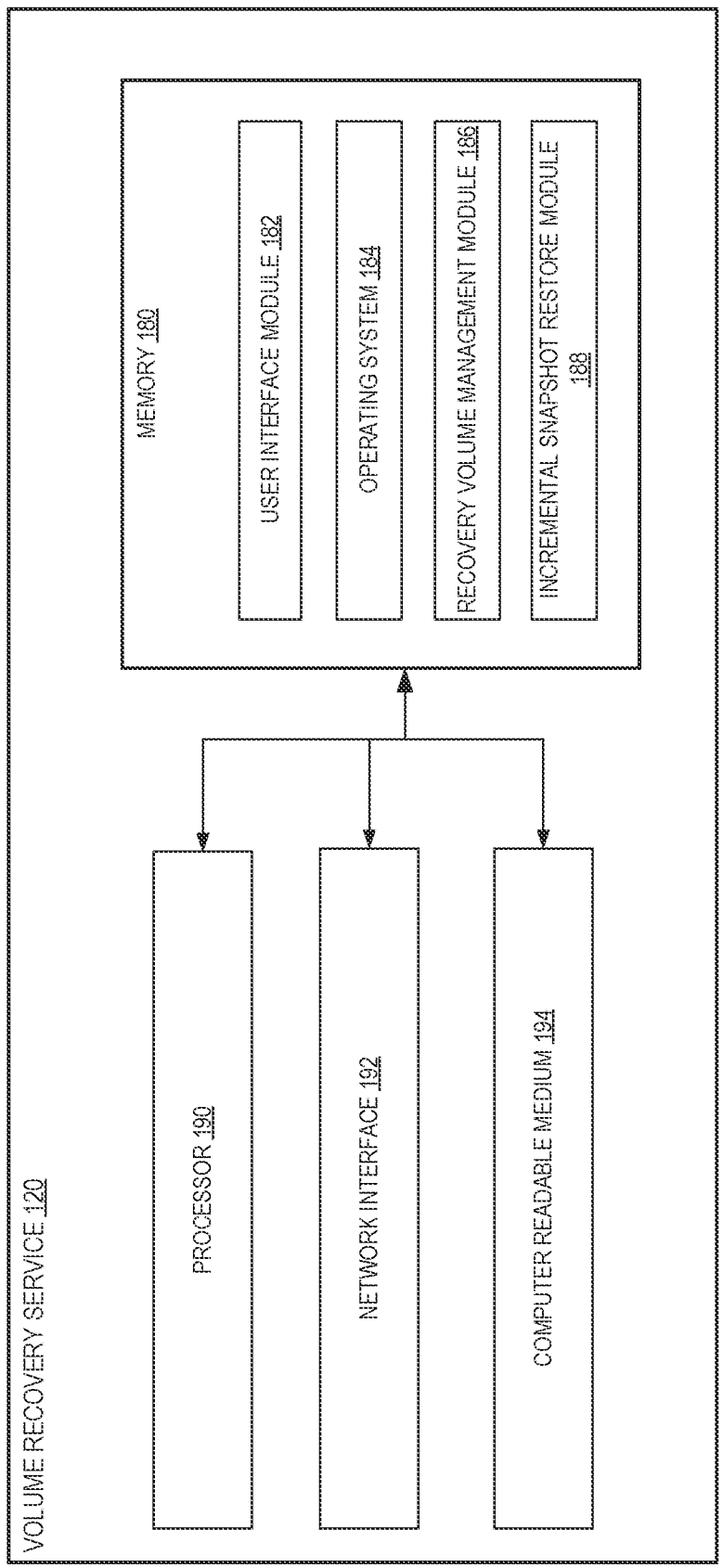
FIG. 9 depicts a general architecture of a computing device or system providing snapshot management in accordance with aspects of the present disclosure.

FIG. 9 depicts an example architecture of a computing system (referred to as the volume recovery service 120) that can be used to perform one or more of the techniques described herein or illustrated in FIGS. 1-8. The general architecture of the volume recovery service 120 depicted in FIG. 9 includes an arrangement of computer hardware and software modules that may be used to implement one or more aspects of the present disclosure. The volume recovery service 120 may include many more (or fewer) elements than those shown in FIG. 9. It is not necessary, however, that all of these elements be shown in order to provide an enabling disclosure. As illustrated, the volume recovery service 120 includes a processor 190, a network interface 192, and a computer readable medium 194, all of which may communicate with one another by way of a communication bus. The network interface 192 may provide connectivity to one or more networks or computing systems. The processor 190 may thus receive information and instructions from other computing systems or services via the network 104 illustrated in FIGS. 1 and 2.

The processor 190 may also communicate with memory 180. The memory 180 may contain computer program instructions (grouped as modules in some embodiments) that the processor 190 executes in order to implement one or more aspects of the present disclosure. The memory 180 may include random access memory (RAM), read only memory (ROM), and/or other persistent, auxiliary, or non-transitory computer-readable media. The memory 180 may store an operating system 184 that provides computer program instructions for use by the processor 190 in the general administration and operation of the public snapshot service 130. The memory 180 may further include computer program instructions and other information for implementing one or more aspects of the present disclosure. For example, in one embodiment, the memory 180 includes a user interface module 182 that generates user interfaces (and/or instructions therefor) for display upon a user computing device, e.g., via a navigation and/or browsing interface such as a browser or application installed on the user computing device.

In addition to and/or in combination with the user interface module 182, the memory 180 may include a recovery volume management module 186 and an incremental snapshot restore module 188. In one embodiment, the recovery volume management module 186 and the incremental snapshot restore module 188 when executed implements various aspects of the present disclosure, e.g., creating and managing recovery volumes and using those recovery volumes to support incremental restore operations, and/or other aspects discussed herein or illustrated in FIGS. 1-8.

While the recovery volume management module 186 and the incremental snapshot restore module 188 are shown in FIG. 9 as part of the volume recovery service 120, in other embodiments, all or a portion of the recovery volume management module 186 and the incremental snapshot restore module 188 may be implemented by other components of the cloud provider network 120 and/or another computing device. For example, in certain embodiments of the present disclosure, another computing device in communication with the cloud provider network 120 may include several modules or components that operate similarly to the modules and components illustrated as part of the snapshot management system 210. In some instances, the recovery volume management module 186 and the incremental snapshot restore module 188 may be implemented as one or more virtualized devices, such as one or more instances 116 on the compute servers 115. Moreover, as noted above, the recovery volume management module 186 and the incremental snapshot restore module 188 may be implemented in whole or part as a distributed computing system including a collection of devices that collectively implement the functions discussed herein.

While FIG. 9 is depicted as the volume recovery service 120, a similar device may be used to implement other elements of FIGS. 1-2. For example, a device having a similar configuration may be used to implement portions of the block store servers 105, such as by implementing the routines of FIGS. 7 and 8.

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid-state memory chips or magnetic disks, into a different state. In some embodiments, the computer system may be a cloud-based computing system whose processing resources are shared by multiple distinct business entities or other users.

The processes described herein or illustrated in the figures of the present disclosure may begin in response to an event, such as on a predetermined or dynamically determined schedule, on demand when initiated by a user or system administrator, or in response to some other event. When such processes are initiated, a set of executable program instructions stored on one or more non-transitory computer-readable media (e.g., hard drive, flash memory, removable media, etc.) may be loaded into memory (e.g., RAM) of a server or other computing device. The executable instructions may then be executed by a hardware-based computer processor of the computing device. In some embodiments, such processes or portions thereof may be implemented on multiple computing devices and/or multiple processors, serially or in parallel.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware (e.g., ASICs or FPGA devices), computer software that runs on computer hardware, or combinations of both. Moreover, the various illustrative logical blocks and modules described in connection with the embodiments disclosed herein can be implemented or performed by a machine, such as a processor device, a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without other input or prompting, whether these features, elements or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, and at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. All changes which come within the meaning and range of equivalency of the claims are to be embraced within their scope.

What is claimed is:

1. A system for conducting incremental restores of object-based snapshots to network-accessible block storage volumes acting as virtualized storage drives for virtual machine instances, the system comprising:
    one or more computing devices hosting a first block storage volume, wherein the first block storage volume contains data corresponding to a first object-based snapshot, the first object-based snapshot representing a distinct copy of data of a block storage volume from which the first object-based snapshot was created at point in time of creation of the first object-based snapshot;
    a data store storing:
        the first object-based snapshot; and
        a second object-based snapshot, wherein the second object-based snapshot represents a distinct copy of data of a block storage volume from which the second object-based snapshot was created at point in time of creation of the second object-based snapshot; and
    at least one computing device comprising a processor configured to:
        obtain an instruction to incrementally restore the second object-based snapshot to the first block storage volume, wherein incremental restore of the second object-based snapshot to the first block storage volume transfers, from the second object-based snapshot to the first block storage volume, blocks of data contained within the second object-based snapshot and not contained within the first block storage volume;
        identify the first object-based snapshot as a source snapshot for the first block storage volume;
        identify block differences between the first object-based snapshot that represents the source snapshot for the first block storage volume and the second object-based snapshot, wherein the block differences indicate blocks of data contained within the second object-based snapshot and not contained within the first object-based snapshot;
        retrieve from the data store one or more blocks of the second object-based snapshot representing to the block differences, wherein the block differences represent less than all blocks of data contained within the second object-based snapshot; and
        write the one or more blocks to the first block storage volume to complete incremental restore of the second object-based snapshot to the first block storage volume.

2. The system of claim 1, wherein the at least one computing device identifies the first object-based snapshot as the source snapshot for the first block storage volume based at least in part on metadata of the first block storage volume.

3. The system of claim 2, wherein the at least one computing device is further configured to update the metadata of the first block storage volume to identify the second object-based snapshot as the source snapshot for the first block storage volume.

4. The system of claim 1, wherein the at least one computing device is further configured to generate the instruction to incrementally restore the second object-based snapshot to the first block storage volume based at least partly on determining that the second object-based snapshot satisfies criteria for maintaining the first block storage volume.

5. A computer-implemented method comprising:
  obtaining an instruction to incrementally restore a first object-based snapshot to a block storage volume, wherein the first object-based snapshot represents a distinct copy of data of a block storage volume from which the first object-based snapshot was created at point in time of creation of the first object-based snapshot;
  identifying a source snapshot for the block storage volume, the block storage volume containing data corresponding to the source snapshot, wherein the source snapshot differs from the first object-based snapshot and represents a distinct copy of data of a block storage volume from which the source snapshot was created at point in time of creation of the source snapshot;
  determining block differences between the source snapshot for the block storage volume and the first object-based snapshot, wherein the block differences indicate blocks of data contained within the first object-based snapshot and not contained within the source snapshot;
  retrieving, from the first object-based snapshot, one or more blocks representing to the block differences, wherein the block differences represent less than all blocks of data contained within the first object-based snapshot; and
  writing the one or more blocks to the block storage volume.

6. The computer-implemented method of claim 5, wherein the block storage volume is a read-only volume prior to writing the one or more blocks to the block storage volume, and wherein the computer-implemented method further comprises modifying the block storage volume to enable writes.

7. The computer-implemented method of claim 5, wherein the block storage volume is a writable volume associated with a write log, and wherein the computer-implemented method further comprises:
  identifying, from the write log, a set of blocks of the block storage volume written to subsequent to writing the source snapshot to the block storage volume;
  retrieving the set of blocks from the first object-based snapshot; and
  writing the set of blocks to the block storage volume.

8. The computer-implemented method of claim 5, wherein the first object-based snapshot is a sparse snapshot that implicitly stores an indication of unwritten blocks, and wherein retrieving one or more blocks representing the block differences from the first object-based snapshot comprises:
  determining that at least one block of the one or more blocks is unwritten; and
  generating the at least one block according to a predefined bit pattern for unwritten blocks.

9. The computer-implemented method of claim 5 further comprising identifying the block storage volume from a plurality of block storage volumes based at least in part on a number of the blocks of data contained within the first object-based snapshot and not contained within the source snapshot for the block storage volume.

10. The computer-implemented method of claim 5 further comprising identifying the block storage volume from a plurality of block storage volumes based at least in part on a distance between the source snapshot for the block storage volume and the first object-based snapshot within a hierarchical tree defining a relationship between the source snapshot and the first object-based snapshot.

11. The computer-implemented method of claim 5, wherein obtaining the instruction to incrementally restore the first object-based snapshot to the block storage volume comprises generating the instruction based at least partly on determining that the first object-based snapshot satisfies criteria for maintaining the block storage volume.

12. The computer-implemented method of claim 11, wherein the criteria include at least one of a time since last incrementally restoring to the block storage volume or a number of new snapshots created from a specified block storage volume since last incrementally restoring to the block storage volume.

13. The computer-implemented method of claim 5, wherein the first object-based snapshot represents data of an individual block storage volume at a first point in time, and wherein the source snapshot represents data of the individual block storage volume at a second point in time prior to or after the first point in time.

14. One or more non-transitory computer-readable media comprising computer-executable instructions that, when executed by a computing system, cause the computing system to:
  obtain an instruction to incrementally restore a first object-based snapshot to a block storage volume, wherein the first object-based snapshot represents a distinct copy of data of a block storage volume from which the first object-based snapshot was created at point in time of creation of the first object-based snapshot;
  identify a source snapshot for the block storage volume, the block storage volume containing data corresponding to the source snapshot, wherein the source snapshot differs from the first object-based snapshot and represents a distinct copy of data of a block storage volume from which the source snapshot was created at point in time of creation of the source snapshot;
  determine block differences between the source snapshot for the block storage volume and the first object-based snapshot, wherein the block differences indicate blocks of data contained within the first object-based snapshot and not contained within the source snapshot;
  retrieve, from the first object-based snapshot, one or more blocks representing to the block differences; and
  write the one or more blocks to the block storage volume.

15. The one or more non-transitory computer-readable media of claim 14, wherein the block storage volume is a read-only volume prior to writing the one or more blocks to the block storage volume, and wherein the instructions further cause the computing system to modify the block storage volume to enable writes.

16. The one or more non-transitory computer-readable media of claim 14, wherein the block storage volume is a writable volume associated with a write log, and wherein the instructions further cause the computing system to:
  identify, from the write log, a set of blocks of the block storage volume written to subsequent to writing the source snapshot to the block storage volume;
  retrieve the set of blocks from the first object-based snapshot; and
  write the set of blocks to the block storage volume.

17. The one or more non-transitory computer-readable media of claim 14, wherein the first object-based snapshot is a sparse snapshot that implicitly stores an indication of unwritten blocks, and wherein to retrieve the one or more blocks representing the block differences from the first object-based snapshot, the instructions cause the computing system to:

determine that at least one block of the one or more blocks is unwritten; and generate the at least one block according to a pre-defined bit pattern for unwritten blocks.

18. The one or more non-transitory computer-readable media of claim 14, wherein the instructions further cause the computing system to identify the block storage volume from a plurality of block storage volumes based at least in part on a number of the blocks of data contained within the first object-based snapshot and not contained within the source snapshot for the block storage volume.

19. The one or more non-transitory computer-readable media of claim 14, wherein the instructions further cause the computing system to identify the block storage volume from a plurality of block storage volumes based at least in part on a distance between the source snapshot for the block storage volume and the first object-based snapshot within a hierarchical tree defining a relationship between the source snapshot and the first object-based snapshot.

20. The one or more non-transitory computer-readable media of claim 14, wherein obtaining the instruction to incrementally restore the first object-based snapshot to the block storage volume comprises generating the instruction based at least partly on determining that the first object-based snapshot satisfies criteria for maintaining the block storage volume.

21. The one or more non-transitory computer-readable media of claim 20, wherein the criteria include at least one of a time since last incrementally restoring to the block storage volume or a number of new snapshots created from a specified block storage volume since last incrementally restoring to the block storage volume.

22. The one or more non-transitory computer-readable media of claim 14, wherein the first object-based snapshot represents data of an individual block storage volume at a first point in time, and wherein the source snapshot represents data of a distinct individual block storage volume.

* * * * *